United States Patent [19]
Kermode

[11] 3,841,734
[45] Oct. 15, 1974

[54] OPTICAL CONTRAST ENHANCEMENT SYSTEM

[75] Inventor: David W. Kermode, Ridgecrest, Calif.

[73] Assignee: The United States as represented by the Secretary of the Navy, Washington, D.C.

[22] Filed: Apr. 10, 1972

[21] Appl. No.: 242,514

[52] U.S. Cl. .................................. 350/166, 350/172
[51] Int. Cl. ............................................. G02b 5/28
[58] Field of Search ............................. 350/166, 172

[56] References Cited
UNITED STATES PATENTS
2,699,092  1/1955  Rantsch ............................. 350/172
3,442,572  5/1969  Illsley ................................ 350/166

Primary Examiner—James W. Lawrence
Assistant Examiner—C. E. Church
Attorney, Agent, or Firm—R. S. Sciascia; Roy Miller; G. F. Baker

[57] ABSTRACT

An improved optical target enhancement device which comprises a pair of lens openings for incoming light, a pair of circular variable filters in alignment therewith, a pair of mirrors and lens openings for outgoing light. Wavelengths are emitted and reflected simultaneously and the color observed by the eye is related to the wavelength separation. This system provides target enhancement which alters the color and appearance of the target relative to the background by changing the ratio of reflected light energies of different wavelengths passed to the detector, the eye, a TV camera tube, or other device.

1 Claim, 9 Drawing Figures

FIG. 4 — CIRCULAR VARIABLE FILTER

3,841,734

OPTICAL CONTRAST ENHANCEMENT SYSTEM

BACKGROUND OF THE INVENTION

Electronic target tracking systems under current development for use in conjunction with television scanner systems rely upon luminous reflection differences to provide point energy differences on the face plate of a vidicon tube. Luminous reflective differences of some objects and materials are enumerated by J. I. Gordon and P. V. Church of the Scripps Institute of Oceanography (see Footnotes 1 and 2 below). Reflected energy differences are the basis of contrast. The largest reflective energy differences (the greater contrast) between adjacent objects provide the best signal for tracking.

Solid glass filters and Wratten type (gelatin film) filters have very wide wavelength transmission bands. Single narrow band optical interference filters in some systems have been appropriately selected and changed to acquire and maintain the highest possible contrast between a particular target and a changing background. Solid glass and Wratten type filters have been limited in their use.

Multispectral sensing systems are elaborated upon in an article published in Applied Optics[1]. Discussion therein is based on fixed (untilted) interference filters.

[1]"A Spectrum Matching Technique for Enhancing Image Contrast" — D. S. Lowe and J. G. N. Braithwaite — *Applied Optics*, Vol. 5, No. 6; June 1966

OPTICAL SENSING

Measurement of energy levels reflected from a target and its background may be taken and plotted on a graph (FIG. 1) to show the energy levels reflected from the target referenced to the energy levels from the background. A line drawn between energy level points A and B separated on the curve form an angle relative to the side AC, the horizontal axis. Side AB of the angle when thus related to angle side AC, is, for the purpose of discussion, termed the "gradient." Contrast between visual points is determined by the energy level difference and the gradient.

All objects reflect light energy in a manner related to the spectral energy absorptance, reflectance, angle of incidence, and transmission properties of the material from which they are formed. The particular hue observed by the average eye is determined by single wavelengths, by combinations of two or more wavelengths and by the intensity of the several wavelengths relative to each other.

Figure 2:
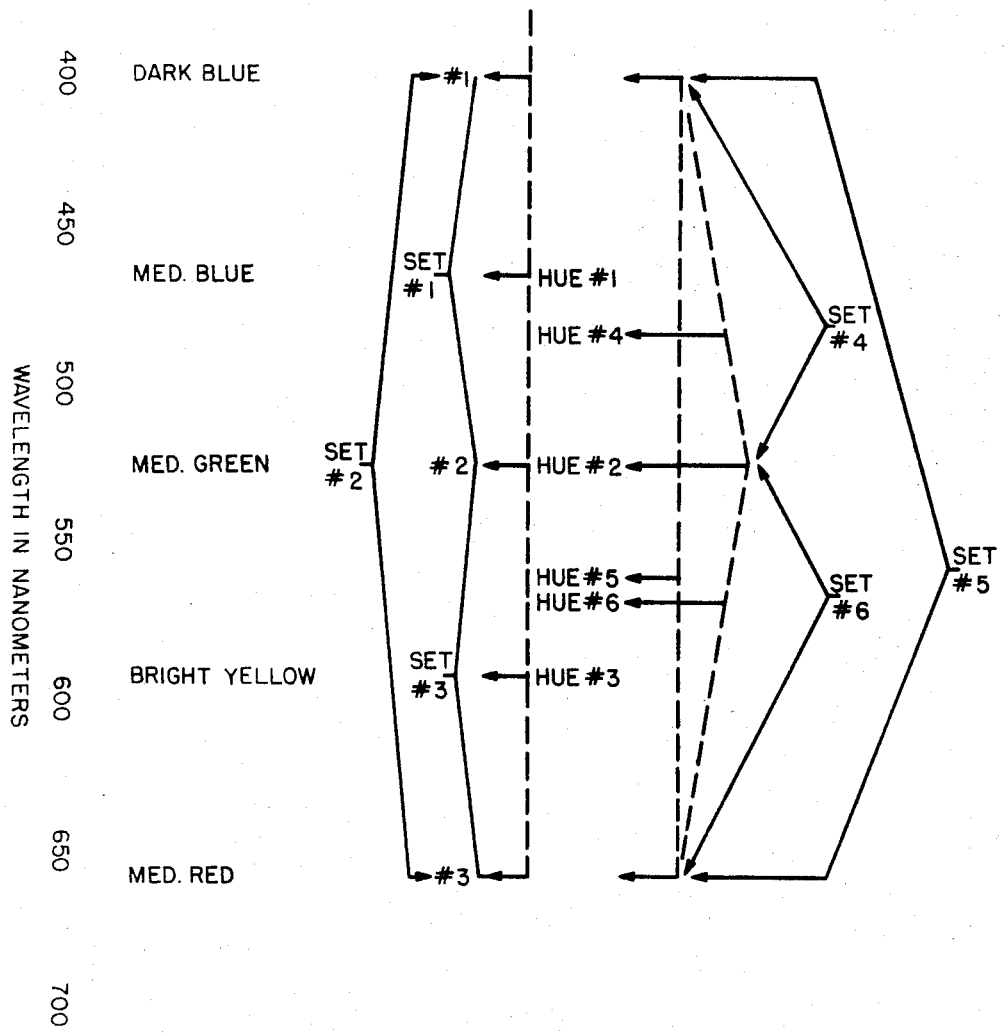
FIG. 2 is a Newtonian representation of a portion of the visible light spectrum.

The above paragraph is illustrated in the simplest way by three separate light wavelengths numbered 1, 2, and 3 emitted and/or reflected in pairs (sets). If arbitrarily numbered light wavelengths 1 and 2 are equal in intensity, hue number 1 will be observed (FIG. 2). If light wavelengths 1 and 3 are equal in intensity, hue number 2 will be observed, and if wavelengths 2 and 3 are equal in intensity, hue number 3 will be observed.

When wavelengths 1 and 2, 1 and 3, or 2 and 3 are emitted or reflected in given unequal intensities relative to the other in the pair, lines 4, 5, and 6 will be observed. Where two or more wavelengths are emitted, or reflected simultaneously, the color observed by the eye is related to the relative wavelength separation, as well as the relative intensities of the several wavelengths. Some simultaneous variations of wavelengths, intensities, and/or both may alter the color saturation from a brilliant color to that of a pastel shade. Viewing a color received from any one point in space will not reveal to the unaided eye the several wavelengths which may operate to produce the observed color. In other words, different materials and/or pigments having the same general color appearance may actually have different wavelength and energy components forming the color. Even critical inspection may fail to reveal the difference.

The target enhancement system to be described (FIG. 3) provides a means for eliminating or reducing the intensity of those light wavelengths present in the background scene as much as possible, while at the smae time passing the greater portion of light energy reflected from a selected target. A double wavelength light filter system increases the target differentiation ability between two visually similar color energy sources of different wavelength composition. Characteristics of the eye operate in conjunction with the target enhancement system to change an observed color as previously described, so that the background appears to be changed in color and brilliance relative to the target. This is particularly true, if the reflected colors passed from adjacent objects by the filters are complementary in nature. A television camera tube detects the energy differences in proportion to the wavelength response of the camera tube. The scanned energy level difference changes the vidicon tube output which appears as a contrast change on a monitored scene.

Summarizing: Elimination, or attenuation of one or more light wavelengths present in a scene has the effect of changing the overall colors, or the quality of colors (brilliant, pastel, etc.) as observed by the eyes. The degree of contrast is an individual interpretation. Reduction of an energy level received from one of a combination of wavelengths reflected from any point, even if not detectable by the eye, may be detected when scanned by a television system.

OPTICAL INSTRUMENTATION

Circular Variable Interference Filter.

Consider that the familiar Fabry-Perot type interference filter consists of several parallel partially reflecting surfaces which are the interfaces between thin film layers of transparent dielectric materials having different refractive indices.

A circular variable interference filter (CVF) is similarly constructed, but with an important difference.

Figure 4:
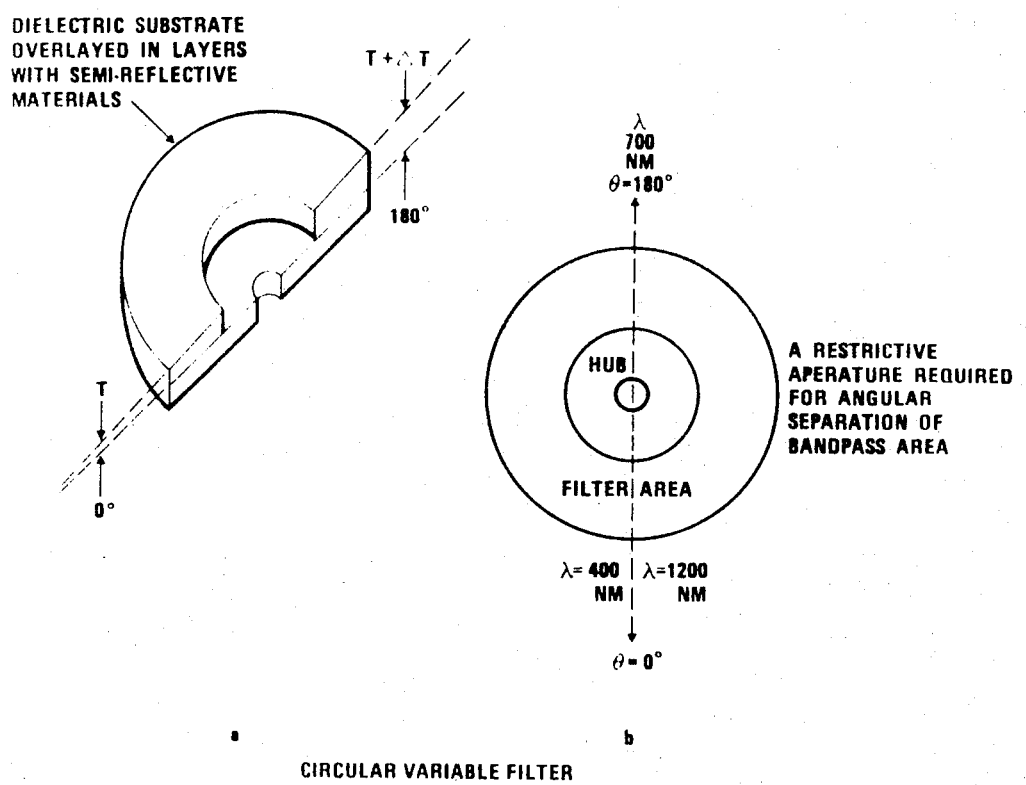
FIG. 4a is a perspective view partly in section and FIG. 4b is a plan view of a circular variable filter useable in the system of FIG. 3.

The reflecting surfaces are separated by dielectric film layers which vary in thickness at a constant angular rate (FIG. 4a). When the reflective and dielectric film "sandwich" is formed in the shape of a circle, the rate of increase of film thickness in 180° of rotation is a linear function of angle. On continuation around the circle from 180° to 360°, the thickness decreases linearly. The wavelength pass, because of the film thickness change, also linearly varies from short to long wavelength and back to short wavelength as a function of angle.

The film on two connected half circles is sometimes arranged so that the film thickness increases through 360° of the composite circle (FIG. 4b). This method is employed to produce a CVF which covers the wavelengths from 400 to 1,200 nanometers.

Optical System.

Figure 3:
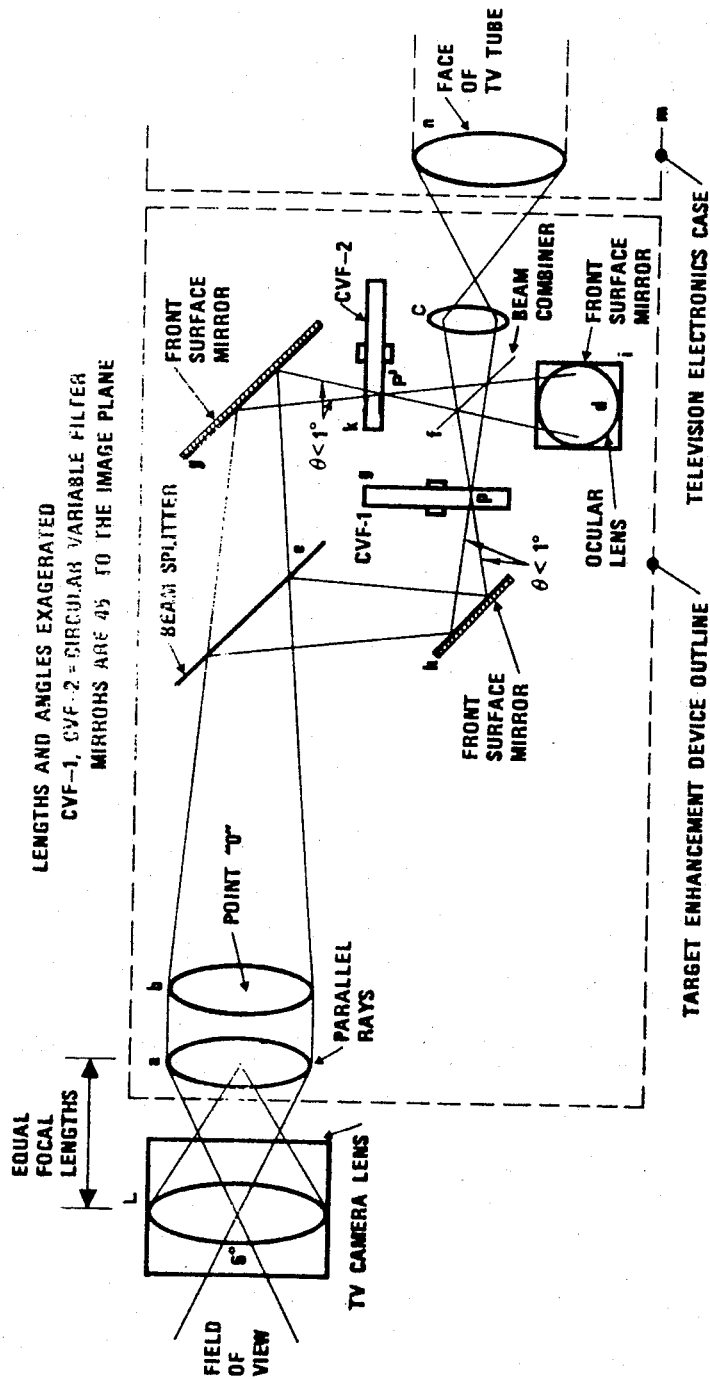
FIG. 3 is a schematic illustration of a target enhancement system according to the invention.

The drawing of FIG. 3 outlines a new optical target enhancement device which alters the color and appearance of the target relative to the background by changing the ratio of reflected light energies of different wavelengths passed to the detector which may be the eyes, a television camera tube, or other device. A television adaptation is illustrated.

Camera lens $l$ (FIG. 3) is removed from the television electronics case $m$ and then fixed in position so that light from the target scene passes through the lens system $a$ and $b$. The target enhancement device is attached to the television case $m$ so that an image from lens $c$ will be focused upon the face of the camera tube $n$. Note that the rays shown past lens $a$ are not those illustrating the image location for lens $l$.

A field of view of approximately 6° was chosen for target tracking tests. A camera lens $l$ of 40 mm diameter and 152 mm focal length was used. A 16 mm aperture lens $a$, also with 152 mm (6 inches) focal length was fixed at the focal point of lens $l$ as indicated in FIG. 3. This arrangement approximates a 6° field of view for the overall system. Light transmitted through lens $l$ becomes parallel upon passing through lens $a$. The parallel or paraxial rays from lens $l$ permit the convenient positioning of lens $b$, and allows $b$ to have any focal length required by the system.

Circular variable filter CVF-1, CVF-2 require that the light cone from lens $b$ to the focal points $p, p'$ at the CVF faces not exceed 1°. A lens of 16 mm diameter with a focal length (or optical system equivalent) greater than 456 mm (18 inches) will satisfy this requirement. The lens focal cone of 1 degree provides an angle of ½° each side of the optical axis with a blur circle of 0.035 inches at the points $p, p'$ on the CVF's. Limiting the cone angle to 1° precludes the need for an auxiliary aperture stop.

The lens $b$ image cone is divided into two paths for direction to the two CVF's. Optical beam splitter $e$ divides the image, passing approximately one-half the light through to be reflected toward CVF-2 by front surface mirror $g$ and reflects the remaining light toward front surface mirror $h$ for further reflection toward CVF-1. Length of the optical path from point "0" to the two points $p, p$ on CVF-1 and CVF-2 is identical.

Optical beam combiner $f$ is positioned equidistant from CVF-1 and CVF-2 parallel to mirrors $g$ and $h$ on the optical axis of the two light cones passed through the points $p, p$.

The image cone from CVF-1 transmitted through beam combiner $f$ is coincident with the image cone transmitted through CVF-2 and reflected from $f$ through lens $c$. Conversely, the image cone from CVF-2 transmitted through $f$ is coincident with the image cone from CVF-1 reflected from $f$ through ocular lens $d$. Those image components from $f$ directed through lens $c$ arrive at the television camera tube face $n$ inverted top to bottom and reversed left to right which is the normal image orientation for the tube. Mirror $i$ inverts the image components from $f$ and directs the image through ocular lens $d$ with correct orientation for viewing.

TEST INSTRUMENTATION

The target enhancement system according to the invention was attached to a television camera and contained a set of two fixed band interference filters. The filters were mounted so they could be tilted relative to the optical system axis, to provide a changeable passband for the filters. Tiltable filters were substituted for the circular variable filters for test purposes.

Figure 5:
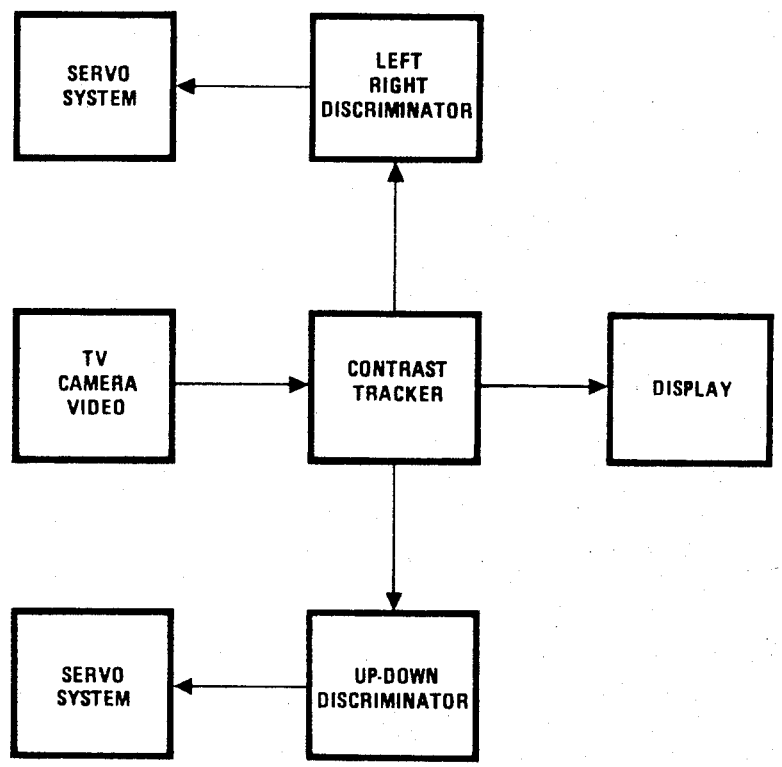
FIG. 5 is a simplified block diagram of a servo-activated television camera tracking system.

A standard COHU manufacture camera with an RCA-7735A vidicon tube was used with an electronic contrast tracking system. FIG. 5 is a simplified block diagram of the servo-actuated television camera tracking system.

The camera video output of the system was fed into the contrast tracker. A small field outline (window) is supplied to the Display Unit by the tracker. The window outline can be positioned anywhere within the field of view by manual operation of switches controlling the two Servo System units. Once positioned, the Left-Right and Up-Down Discrimination units fed by the tracker will operate the servo systems to maintain the same window position in the television picture.

Video output of the camera is fed into a closed circuit television monitor connected in parallel with a test oscillograph so that the contrast difference may be seen, as well as measured in millivolts. This test set-up was used in conjunction with a television scan line counter to accurately determine the image position being recorded by the oscillograph.

Test measurements were made using the s-component (see below) of the tilted filter light transmissions. Angles of tilt were limited from 0° to 48° by the tilting mechanism to match the diameter of the light path at the filter surface plane. A polarizing filter in front of the camera lens was oriented for polarization 90-degrees to the filter tilting axis. This polarizer reduced the energy levels of the p-components permitting system employment of the s-component for target tracking.

The peak transmission wavelength of several interference filters on hand ranged from 400 to 700 nanometers. Filters giving the best results with the available instrumentation were filters with a 670 and a 585 nanometer peak transmission wavelength at normal incidence.

TEST METHOD

Tracking tests were made under artificial light using a multicolored picture. The picture, which filled the field of view, was moved and tracked by the camera. There was no difficulty in tracking when luminance was kept above the vidicon minimum operating level. Changes in the filter tilt angle were used to cause the camera to-track, or not to track various portions of the picture.

The television camera was directed toward an area of sunlit desert containing a small building and a few colored objects. The colored objects (targets) were visually compared with color charts for approximating the peak reflectance wavelengths. Colors of target objects closely matched the chart wavelengths 485, 537, 615, and 648 nanometers.

Data for operation of a 7,735A vidicon tube at maximum sensitivity was taken from an RCA Corporation instruction brochure. The brochure indicated that maximum sensitivity of the 7,735A tube would be obtained with a vidicon highlight current of $0.34\mu a$ and a dark current of $0.20\mu a$, the highlight difference current being $0.14\mu a$. The difference current to highlight current ratio $0.14\mu a/0.34\mu a$ is 0.4, approximately. Gamma for this tube is stated to be 0.65.

A minimum operating light level to be maintained on the vidicon face plate during the test was established by trial and adjustment to a point where sacrifice of contrast for greater sensitivity produced marginal operation.

The minimum measured video current step, trackable by the target tracking system used, averaged $0.006\mu a$, with a contrast ratio of 0.055.

A photographic record was made of oscilloscope trace lines showing the camera and television system output variations in millivolts. The television camera was left stationary while the two interference filters were tilted to various angles for a photographic series.

TEST RECORD

Tilt angles of the interference filters were recorded concurrent with a record of the television system output. The following table of tilt angles is graphically related to FIG. 6 to the various output levels obtained from the colored targets.

TABLE 1

| Curve (FIG. 6) | Filter No. 1 Degrees (670 nanometer center pass) | Filter No. 2 Degrees (585 nanometer center pass) |
|---|---|---|
| No. 1 | 5 | 47 |
| No. 2 | 43 | 35 |
| No. 3 | 39 | 30 |

Output levels references to a video output dark level of 41 millivolts were charted in Table 2.

Table 2

| Colored Object Peak Wavelength (nanometers) | Highest Level (millivolts) | Lowest Level (millivolts) | Maximum Change (millivolts) |
|---|---|---|---|
| 485 | 186 | 68 | 118 |
| 537 | 190 | 101 | 89 |
| 615 | 296 | 202 | 94 |
| 648 | 208 | 80 | 128 |
| White | 524 | 307 | 217 |

ENHANCEMENT CALCULATION

Vidicon tube operating data and the tracker current requirements listed above (page 11) determine that the tube supplies 7.49 contrast steps, as follows:

$I_{VP}$ = Vidicon Peak Current = $0.34\mu a$ $I_{VD}$ = Vidicon Dark Current = $0.20\mu a$ $R_T$ = Minimum Tracking Current Ratio = $0.055$ $$I_{VP} - I_{VD}/I_{VP} = 0.34\mu a - 0.20\mu a/0.34\mu a$$
$$= 0.412 \text{ Vidicon Output Ratio}$$

(Ex 1)

$$I_{VP} - I_{VD}/I_{VP} \div R_T = 0.412/0.055$$
$$= 7.49 \text{ Vidicon Contrast Steps}$$

(Ex 2)

Output of the vidicon, video system employing the image enhancing optic as observed on an oscilloscope was as follows:

$V_P$ = Video Peak Voltage in $mv$ = 524
$V_D$ = Video Dark Voltage in $mv$ = 41

$$V_P - V_D/V_P = 524 \ mv - 51 \ mv/524 \ mv$$
$$= 0.921 \text{ Video Output Ratio}$$

(Ex 3)

$$V_P - V_D/V_P \div I_{VP} - I_{VD}/I_{VP} = \text{Video Output Ratio/Vidicon Output Ratio}$$
$$= 0.921/0.412 = \text{Gain Ratio}$$

(Ex 4)

$$[(I_{VP} - I_{VD}/I_{VP}) \div R_T][(V_P - V_D/V_P) \div (I_{VP} - I_{VD}/I_{VP})] = \text{Vidicon Contrast Steps} \times \text{Gain Ratio}$$
$$= 7.49 \times 2.24 = 16.78 \text{ Total System Contrast Steps}$$

(Ex 5)

Vidicon tube contrast formulated above (Ex 1) expresses the capability of the tube to differentiate between light and dark. Contrast steps available using the unenhanced vidicon are indicated in Ex 2. The target enhancement device used before the vidicon tube increased the total contrast steps available from 7.49 to 16.78 (Exs 3, 4, and 5).

Summary: Contrast steps using enhancement
device     16.78
Contrast steps not using enhancement device     7.49
Maximum contrast steps gained     9.29

Figure 7:
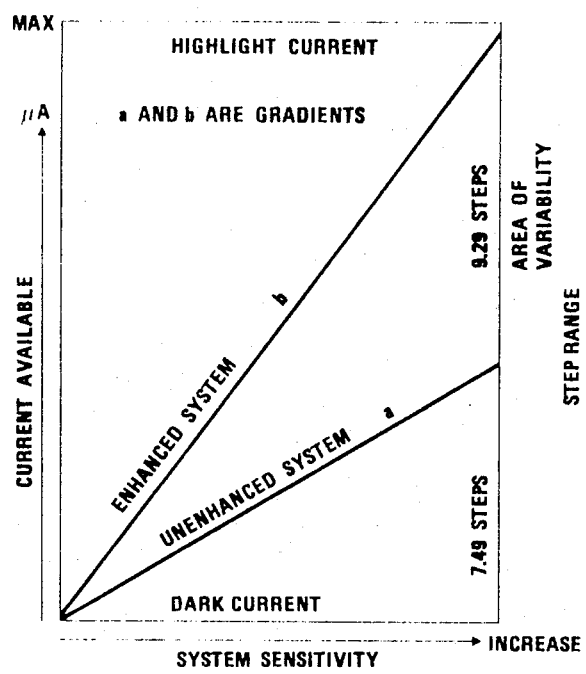
FIG. 7 is a graphical representation of light contrast increase using the system.

FIG. 7 is a graph of the above summary. Curve $a$ in the graph represents the maximum number of vidicon current steps available in the unenhanced system. The maximum contrast increase enhancement can produce is represented by curve $b$. The area between curves $a$ and $b$ represents the potential contrast increase.

It should probably be further explained that the lines on FIG. 7 represent a variation in gradient either due to a change in point separation on the image sensing surface, a voltage change between points, or the result of both types of change. There is no change in voltage as the points are separated, just a change in distance. A voltage change causing an increase in the contrast steps may be obtained between any two colors when there is a reduction in the energy falling on the vidicon face from one of the colors while the energy from the other color is not reduced. This larger voltage difference may be obtained between two targets by the moving of one filter so that one of the targets falls in the area between curve *a* and curve *b* while leaving the other target on curve *a*.

Figure 1:
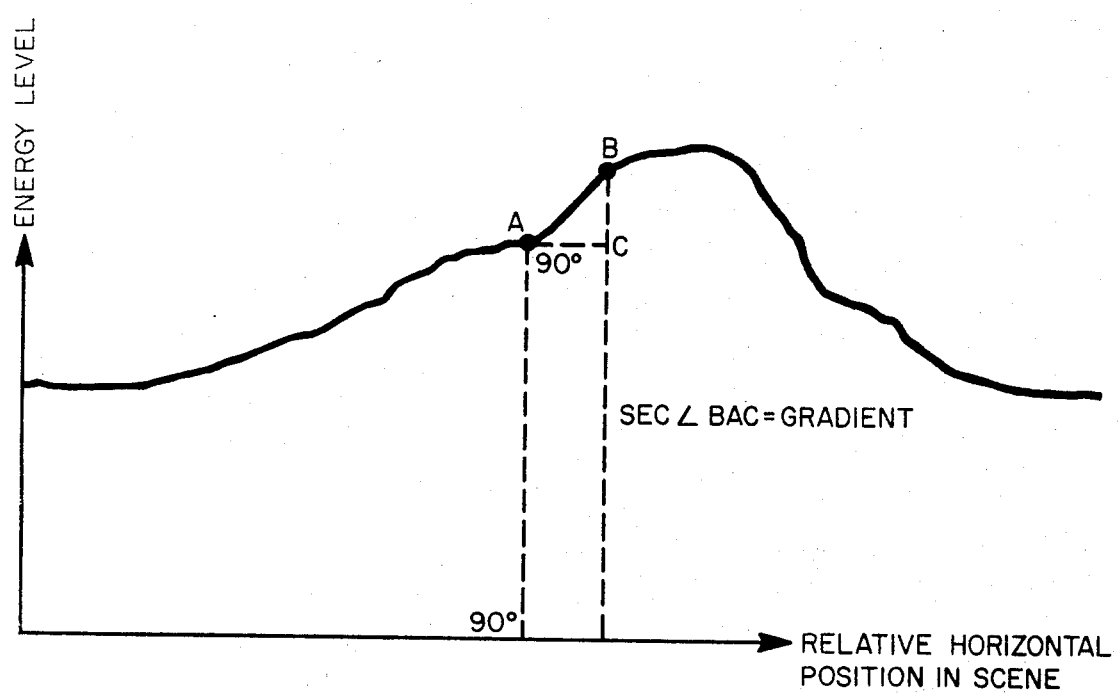
FIG. 1 is a graph of energy levels reflected from a target.

The output signal is related to the vidicon faceplate characteristics as follows:

$i_s$ = Vidicon output signal current
C = A constant dependent on vidicon target potential I = Vidicon faceplate illumination (ft candles)
$\gamma$ = Nominal vidocon gamma (0.65 for 7735A Vidicon)
Vidicon transfer characteristic $i_s = CI$
Differentiating $DI/I = 1/\gamma \; dis/is$ Change Ratio
Substituting voltage indicate on the oscilloscope for current
$dI/I = 1/\gamma \; dE_s/E_s = 1/0.65 \; dE_s/E_s = 1.54 \; dE_s/E_s$ Change Ratio
Gamma multiplier $1/\gamma = 1/0.65 = 1.54$ The video level maximum difference is obtained.
Maximum (white light) level 524 mv
Minimum (dark) level −41 mv
Level difference, maximum 483 mv Assuming that adjacent targets are reflecting 485 nm and 615 nm with the maximum and minimum levels charted in Table 2 (page 11). The steepest gradient between the two colors is obtained when the energy of wavelength 485 nm is at its minimum of 68 mv and the wavelength of 615 nm is at its maximum, thus:

Color 615 nm 296 mv maximum level
Color 485 nm −68 mv minimum level 228 mv level difference As an example, lever 68 mv may be represented by point A in FIG. 1. C is then also 68 mv. Then if B represents 296 mv, BC represents the 228 mv difference. Point B may represent 296 mv and line (distance BC) represents 296 mv−68 mv or 228 mv. When the targets are adjacent, indicated by a short distance AD, the angle BAC, or gradient, is large. With BC held constant, it follows that a small target separation AC assures a steep gradient and the highest contrast available.

The highest levels charted in Table 2, for the various colors represent the levels obtained with both filters passing the same color from a given target. This is equivalent to the passing level from a single interference filter peaked at the common peak of the two filters used in this system. However, the minimum levels shown are approximately those for either a single or two filter system. The salient difference between the single and the two filter system is that with the single filter, the energy level from one color only may be related to a nearly constant background, and with the two filter system several relationships may be established. That is, two colors from the same target may be related to the background with possible increased contrast colors from two targets may be related to the background with varying contrast; energy from the same or different colors reflected from separate targets may be altered and equalized to increase or reduce contrast.

As pointed out in the above paragraph, a maximum energy level from a target is obtained when both filters are passing the same color. It should be understood that if the target color is composed of a more than one wavelength mixture, a similar maximum level may be obtained if the two filters are adjusted to each pass one and different predominent target color. This is a useful factor if the background or adjacent targets reflected to a lesser degree just one of the color wavelengths.

Since the response to any given color can be adjusted by changing the filter tilt angle so that the filter transmission curve has an appropriate value (in the range between maximum and minimum transmission for the filter), and since the system has two of these filters, it is possible to adjust the system so that two targets will have no contrast. That is to say, if a red object is located on a green background, the two filters can be adjusted to produce zero contrast at the edges of the red object. The above is true for a range of objects with moderate reflectance values, and with a single predominant wavelength in their reflectance spectrum. This is illustrated by the responses for the four colors indicated on curve 1 of FIG. 6. With this particular angular orientation of both filters all four colors produced a simultaneous video voltage that was within 10 percent of a common level. A white object in the field of view would, however, have color components that would match the peak transmissions of both filters, and would therefore produce considerable response at this particular angular setting. This would enable a white object to be detected better against a background containing 485, 537, 615, and 648 nm reflecting objects, than would be the case with no contrast enhancement. The advantage of this system over the more conventional one with one filter only is that there are at least two, and usually many more, wavelengths that can be discriminated against.

Figure 6:
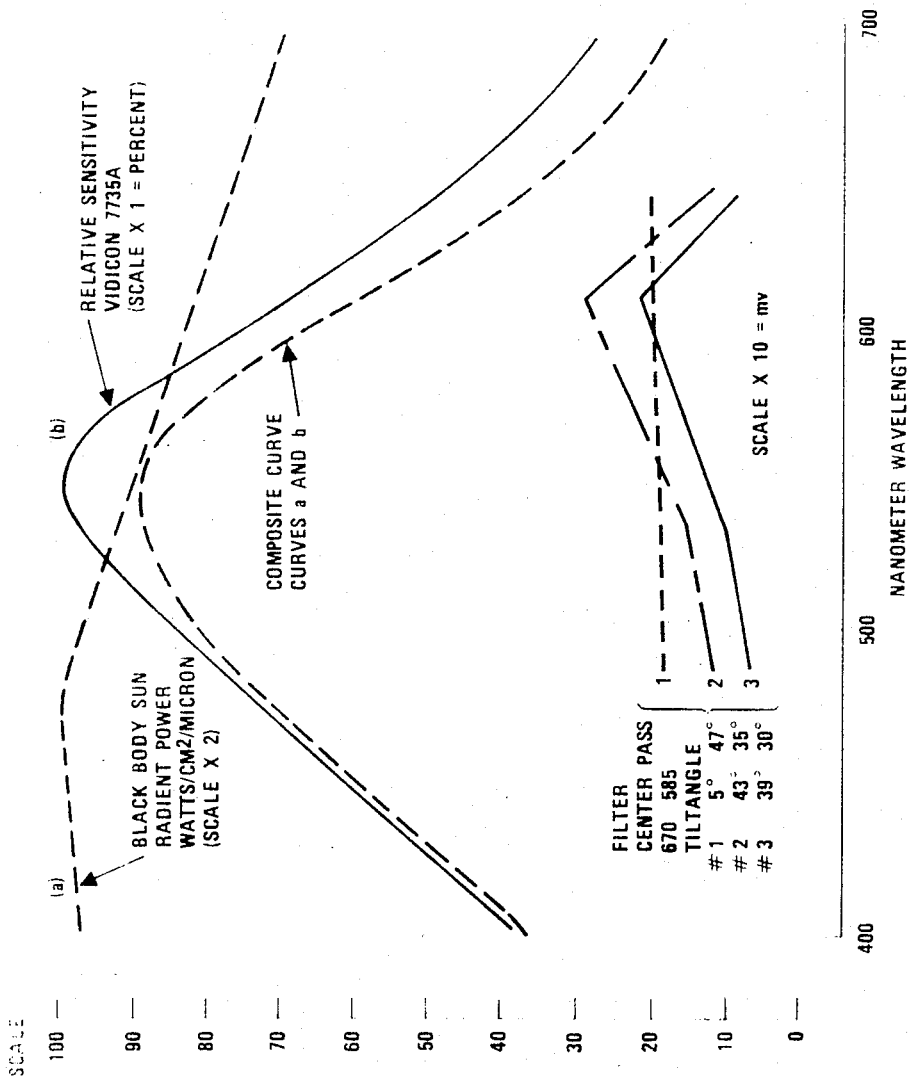
FIG. 6 is a graph of tilt angle values from Table 1.

The response curves to these same wavelengths at a different set of filter tilt angles are illustrated by curves 2 and 3 in FIG. 6. In these two cases, the response at 615 nm is 56 to 76 percent higher than the average response of 166 mv for the four wavelengths. Thus a light red object would be more apparent on the display screen or to the eye. The response of this filter combination would also be high to these colors included in white light, therefore you would now see increased contrast for both red and white relative to objects of other colors.

NOTES ON THE USE OF TILED FILTERS

Discussion and a summary of theory related to tilted interference filters has been published[2]. Attention is brought to the existence of band pass doublets which increase in separation as the angle of incidence of light on the filter increases. The longer wavelength section of the p-component band is light transmitted polarized parallel to the plane of incidence. Shorter doublet s-component wavelengths are those light rays polarized at right angle to the plane of incidence. The s-component bandwidth is, also, the narrowest of the two bandwidths. The narrower band provides a steeper energy slope from the center wavelength so the useful transmission shift is greater per degree of incident angle change from the normal.

[2]"Spectrophotometry of Faint Sources with Tilting-Filter Photometry" R. H. Eather and D. L. Reasoner — Applied Optics Vol. 8, No. 2; Feb. 1969.

Figure 8:
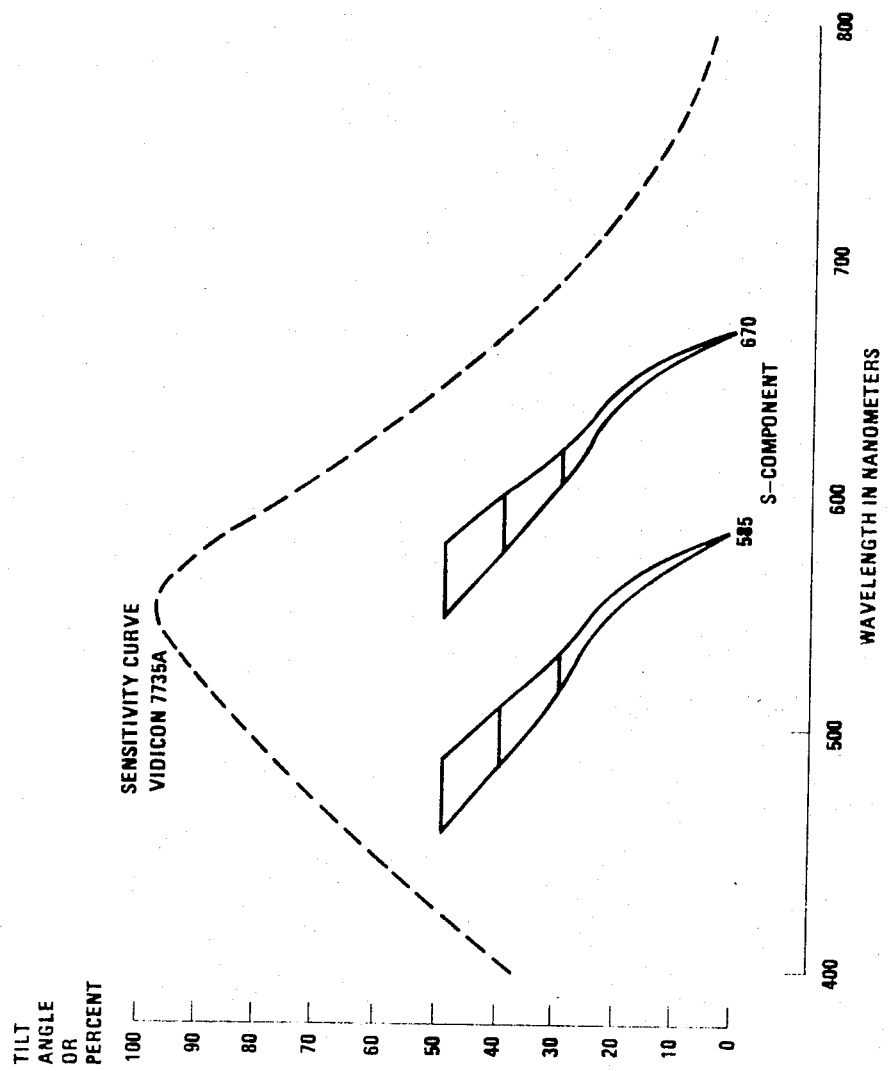
FIG. 8 is a graph relating two wavelength curves to a sensitivity curve of a selected vidicon tube.

In FIG. 8, two separate curves are related to the sensitivity curve of the RCA-7735A vidicon tube. The s-component curves for the filters used indicate an increase in pass bandwidth as the tilt angle is increased.

Tilted interference filters are a valuable component in an optical target enhancement device. Best results with their use are obtained by providing several sets of filters for use in various combinations. The wavelength shift obtained by tilting the filters greatly reduces the number of filters required to cover the visual and near infrared wavelengths. An inconvenience of searching for or even just changing filter combinations remains.

CONTRAST ENHANCEMENT BY CIRCULAR VARIABLE FILTERS

Circular variable filters make it feasible to use all polarization components of the light which passes through the target enhancement optical system. The variation in bandwidth with rotation of the filter is a negligible factor in target enhancement optics. Variation in light energy transmission levels occur with changes in wavelength, however, such small transmission differences that do occur, are also negligible in effect.

A single CVF, as stated above, can cover the entire visible range and extend into the near infrared wavelengths as far as 1,200 nanometers. This range includes the peak wavelength reflectance from trees, bushes, and other forms of foliage.

The use of two CVF's with narrow pass bands independently covering the same 400 to 1,200 nanometer range gives a versatility and setting repeatability for target discrimination greatly in excess of that obtained from tiltable filters and changing bandwidths.

What is claimed is:

1. Optical contrast enhancement means comprising:

filter means changing the reflected light of different wavelengths emanating from an object and passing through said filter;
detector means receiving light energy passing through said filter means;
said filter means comprising two orthogonal circular variable interference filters;
a beam splitter in the optical path between said object and said detector operable to divide the light beam into first and second orthogonal secondary beams;
means for combining said secondary beams;
one of said variable filters being situated athwart each said secondary beam; and
image inversion means operable to correctly orient the image components of the optical beam for viewing.

* * * * *